United States Patent
Arrowsmith

(10) Patent No.: US 7,757,159 B1
(45) Date of Patent: Jul. 13, 2010

(54) METHOD OF DETERMINING THE PROJECTED AREA OF A 2-D VIEW OF A COMPONENT

(75) Inventor: Douglas S Arrowsmith, Milford, MI (US)

(73) Assignee: Yazaki North America, Inc., Canton, MI (US)

( * ) Notice: Subject to any disclaimer, the term of this patent is extended or adjusted under 35 U.S.C. 154(b) by 794 days.

(21) Appl. No.: 11/700,563

(22) Filed: Jan. 31, 2007

(51) Int. Cl.
*G06F 17/27* (2006.01)

(52) U.S. Cl. ............ 715/211; 715/246; 715/247; 345/440; 345/441

(58) Field of Classification Search .......... 715/211, 715/246, 247
See application file for complete search history.

(56) References Cited

U.S. PATENT DOCUMENTS

| | | | |
|---|---|---|---|
| 4,800,287 A | | 1/1989 | Green, Sr. et al. |
| 5,724,143 A | * | 3/1998 | Huber et al. .......... 356/629 |
| 5,778,384 A | | 7/1998 | Provino et al. |
| 6,088,137 A | * | 7/2000 | Tomizawa .............. 358/538 |
| 6,132,486 A | * | 10/2000 | Dixon ..................... 75/247 |
| 2001/0019620 A1 | * | 9/2001 | Nagai et al. ............ 382/104 |

OTHER PUBLICATIONS

Eddie Heard and Wallace Dominey; Tutorial: How to Prepare an Image for Use on Learn.Rice.edu Using Microsoft Paint; Rice University; Jan. 11, 2005; pp. 2, 4-5, and 19.*

* cited by examiner

*Primary Examiner*—Doug Hutton
*Assistant Examiner*—Andrew R Dyer
(74) *Attorney, Agent, or Firm*—Harness, Dickey & Pierce, P.L.C.

(57) ABSTRACT

A method of determining a projected area of a component can include acquiring an image file having a component drawing. The component drawing of the image file can be superimposed onto a workspace. One of a component area and a non-component area can be shaded with a first color to create a shaded image file. The other of the component area and the non-component area can have a second color distinct from the first color. A ratio of the first color verses the second color can be calculated. The projected area of the component can be determined based on the ratio calculated.

15 Claims, 12 Drawing Sheets

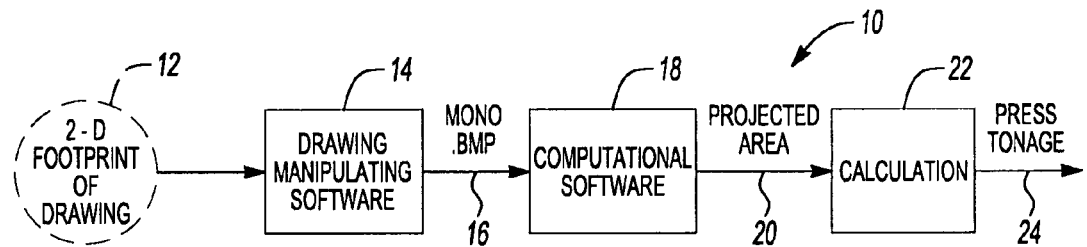
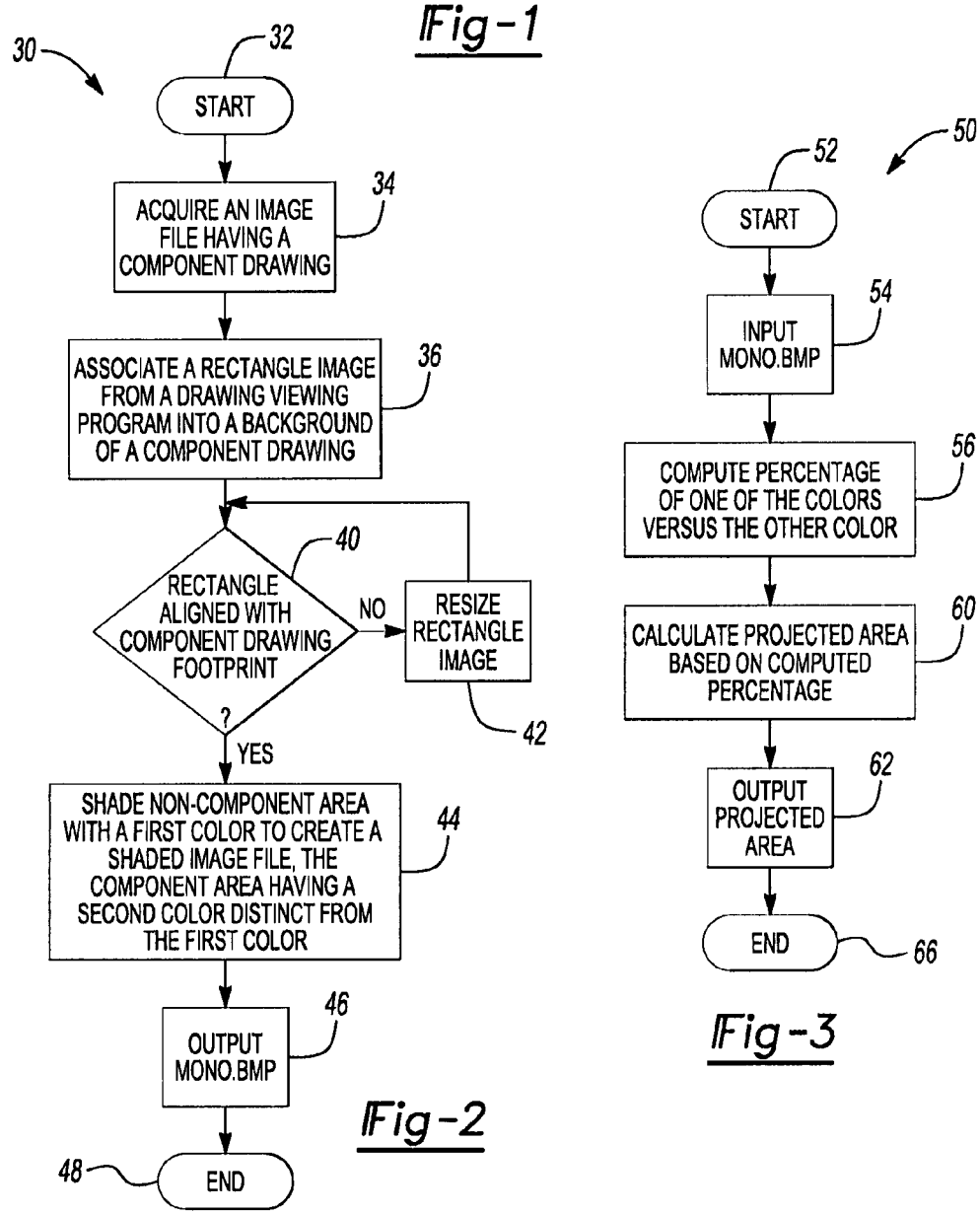

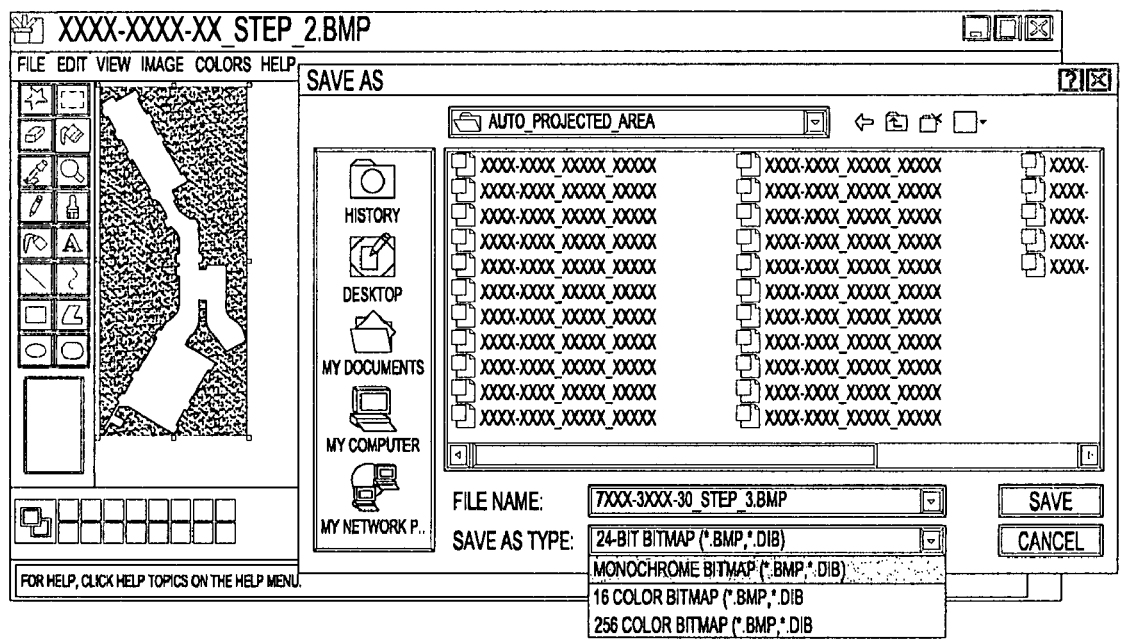
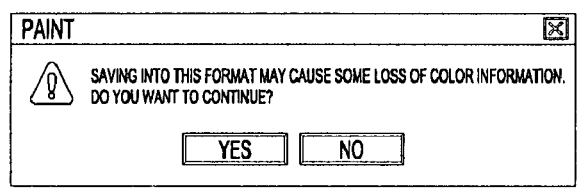
Fig-18

| | A | B | C | D | E | F |
|---|---|---|---|---|---|---|
| 1 | | DATE | 5/31/2006 | PART DESCRIPTION | ENGINE SHIELD BASE | |
| 2 | | RFQ# | 1 | PART NUMBER | 7284-3286-30 | |
| 3 | | VOL | 285,000 | BUYER | J. DOE | |
| 4 | | | | TOOLING TYPE | PRODUCTION | |
| 5 | | | NUMBER OF YEARS OF PRODUCTION | | 4.0 | |
| 6 | | | $X_{MAJ}$ (MM) | $Y_{MAJ}$ (MM) | $Z_{MAJ}$ (MM) | $Z_{PL}$ (MM) |
| 7 | | DIMEN- | 630.91 | 259.9 | 73.64 | 40 |
| 8 | | SIONAL | SHAPE (X-Y) | $X_{MIN}$ (MM) | $Y_{MIN}$ (MM) | MASS (G) |
| 9 | | DATA | IRREGULAR | | | 205.8 |
| 10 | | | PROJECTED AREA (IN$^2$) | 74 | ESTIMATE USING MS PAINT | |
| 11 | | | | | HINGED? | YES |

100 — 102 — 110

MICROSOFT EXCEL

PLEASE NAVIGATE TO AND SELECT THE MONOCHROME BMP FILE NOW. THE BMP FILENAME SHOULD CONTAIN NO BLANK SPACES AND NO APOSTROPHES OR QUOTE MARKS

[ OK ]   [ CANCEL ]

Fig-19

| | A | B | C | D | E | F | G |
|---|---|---|---|---|---|---|---|
| 1 | DATE | | 5/31/2006 | PART DESCRIPTION | | | |
| 2 | RFQ# | | 1 | PART NUMBER | | | |
| 3 | VOL | | 285,000 | BUYER | | | |
| 4 | | | | TOOLING TYPE | | | |
| 5 | | | NUMBER OF YEARS OF PRODUCTION | | | | |
| 6 | | | $X_{MAJ}$ (MM) | $Y_{MAJ}$ (MM) | | | |
| 7 | DIMEN- | | 630.91 | 259.9 | | | |
| 8 | SIONAL | | SHAPE (X-Y) | $X_{MIN}$ (MM) | | | |
| 9 | DATA | | IRREGULAR | | | 205.8 | SHIFTS PER DAY |
| 10 | | | PROJECTED AREA (IN²) | 74 | ESTIMATE USING MS PAINT | | DAYS PER WEEK |
| 11 | | | | | HINGED? | YES | WEEKS PER YEAR |

Dialog box:
MICROSOFT EXCEL
TOTAL AREA OF ENVELOPE IN SQUARE INCHES: 254.0
29% WHITE
PROJECTED AREA OF PART IN SQUARE INCHES: 74.0
PROCESSED IN 00:00:32
OK

METHOD OF DETERMINING THE PROJECTED AREA OF A 2-D VIEW OF A COMPONENT

FIELD

The present disclosure relates to methods for determining an area of an object, and more particularly to a method of determining a projected two-dimensional area of a part using drawing manipulation software that outputs an image file and computational software that calculates a projected area from the image file.

BACKGROUND

In many applications it is desirable to estimate a projected area of a component. In one application, a projected area of a component is needed to predict an injection mold machine (i.e., press) tonnage necessary to mold such a component. One method to estimate such an area can include simplifying a drawing of the component into a plurality of known shapes, such as polygons. Each of the known shapes can then be summed to determine an area.

Another method can include drawing a boundary having a known shape around the component in the drawing. One exemplary boundary can be a rectangle. Next, a plurality of shapes having a known area can be placed on the non-component areas of the drawing. Exemplary shapes can be polygons. An area of each of the shapes can then be summed. The summed result can then be subtracted from the boundary area to determine a resultant component area. Such methods can be time consuming and are prone to error. What is needed is a relatively simple method to determine a two-dimensional area of a component in a drawing without requiring particular skill in the area of mathematics, CAD software manipulation or other more complicated calculations or systems.

SUMMARY

A method of determining a projected area of a component can include acquiring an image file having a component drawing. The component drawing of the image file can be superimposed onto a workspace. One of a component area and a non-component area can be shaded with a first color to create a shaded image file. The other of the component area and the non-component area can have a second color distinct from the first color. A ratio of the first color verses the second color can be calculated. The projected area of the component can be determined based on the ratio calculated.

According to additional features, a tonnage of a press can be calculated based on the projected area. The workspace can be cropped to actual boundaries of the component in the component drawing. In one example, the acquired image file can be copied within a Microsoft Windows® operating system. The shaded image file can include a monochrome bitmap file.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a logic diagram according to an aspect of the present teachings;

FIG. 2 is a flowchart illustrating exemplary steps of the drawing manipulation software shown in FIG. 1;

FIG. 3 is a flowchart illustrating exemplary steps of the computational software of FIG. 1;

FIG. 18 is a screen shot illustrating the component being saved as a monochrome bitmap;

FIG. 19 is a screen shot illustrating activation of a Maco wherein a user is prompted to select the monochrome bitmap saved in FIG. 18;

FIG. 21 is a screen shot illustrating an output of the Macro including the projected area of the component.

DETAILED DESCRIPTION OF EXEMPLARY EMBODIMENTS

Figure 4:
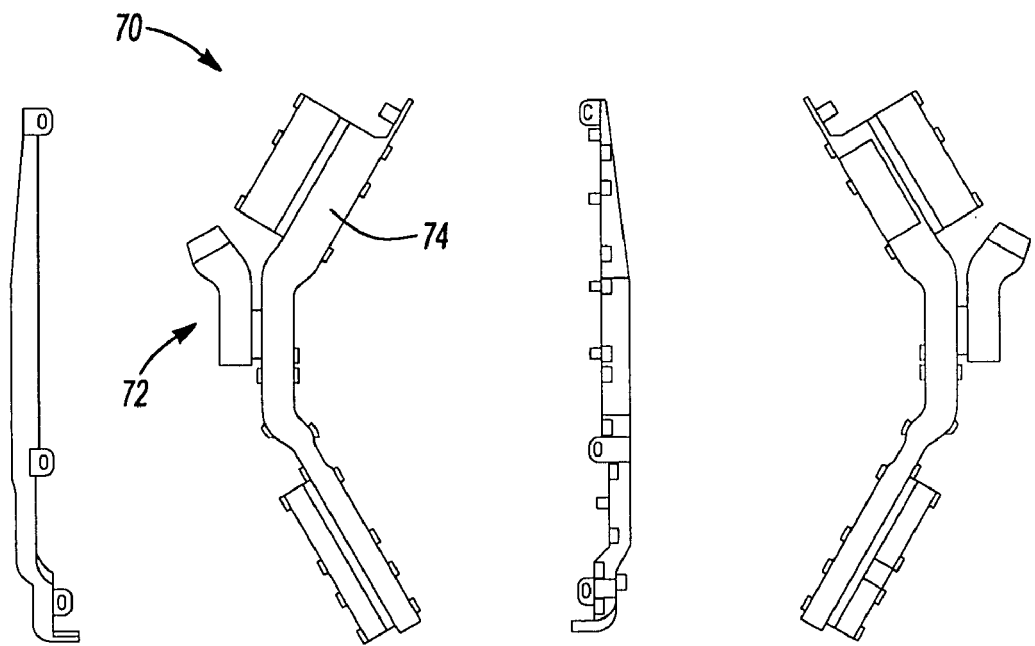
FIG. 4 is a screen shot of an exemplary drawing file having a two-dimensional view of a component desired for area prediction.

The following description is merely exemplary in nature and is in no way intended to limit the disclosure, its application, or uses.

With initial reference to FIG. 1, an exemplary logic diagram according to the present teachings is shown and generally identified at reference number 10. The logic diagram 10 is a simplified flow chart showing exemplary steps that can be performed. In sum, the logic diagram can input a two-dimensional footprint of a component drawing and ultimately determine a press tonnage needed for constructing (i.e. molding) the component. In general, the logic diagram can include inputting a two-dimensional footprint of a component drawing 12 into drawing manipulating software 14. A user can navigate the drawing manipulation software 14 to output a monochrome bitmap file 16. The user can input the monochrome bitmap file 16 into computational software 18 to output a projected area 20. The projected area 20 can be input into a formula or calculator 22 to determine a press tonnage 24 needed to construct the component.

With continued reference to FIG. 1 and additional reference to FIG. 2, an exemplary method for using the drawing manipulation software 14 is shown and identified generally at reference 30. The method starts in step 32. In step 34, an image file can be acquired having a component drawing. In step 36, a rectangle image from a drawing viewing program can be associated into a background of the component drawing. In step 40, the method determines if the rectangle is aligned with the component drawing footprint, i.e., outer boundary and inner boundaries (if any) of the component in the component drawing. If the rectangle is not aligned, the rectangle image can be resized in step 42. The method then loops to step 40. If the rectangle is aligned with the component drawing footprint in step 40, the non-component area, i.e., the portion of the component drawing outwardly of the outer boundary and inwardly of the inner boundary (if any) can be shaded with a first color to create a shaded image file in step 44. The component area, i.e., the area inwardly of the outer boundary and outwardly of the inner boundaries (if any), can have a second color distinct from the first color. In step 46, a monochrome bitmap 16 file can be saved. The method ends in step 48.

With reference now to FIGS. 1 and 3, an exemplary method for using the computational software 18 is shown and identified generally at reference 50. The method starts in step 52. In step 54, the monochrome bitmap 16 file can be inputted. In step 56, a percentage of one of the colors versus the other color can be computed. In step 60, a projected area can be calculated based on the computed percentage. In step 62, a projected area can be output. The method ends in step 66.

The following FIGS. 4-21 show exemplary screen shots of the method 10 being used. The exemplary screen shots illustrate user manipulation of various software tools provided by the Microsoft Windows® operating system. Such exemplary software tools used here include Microsoft Paint® and Microsoft Excel®. It is appreciated however, that other operating systems and/or software may be used to carry out the steps outlined above. Further, it is appreciated that although such steps characterize an exemplary sequence of operation, similar sequences can be undertaken to achieve similar results.

Figure 5:
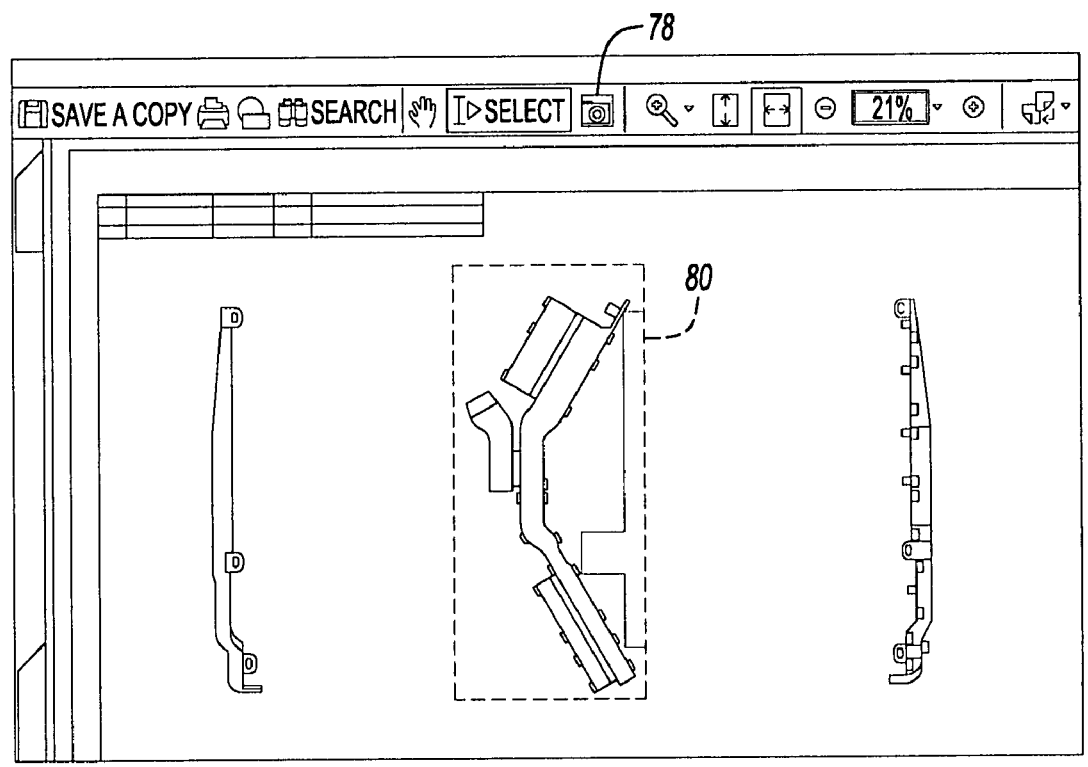
FIG. 5 is a screen shot of the exemplary drawing file shown in FIG. 4 opened up in a drawing viewing program and shown with the desired component selected.

Turning now to FIGS. 4 and 5, acquisition of an image file (step 34, FIG. 2) will now be described. A user first can retrieve a drawing file 70 having a two-dimensional view 72 of a component 74 of interest. The drawing file 70 can be opened in a drawing viewer capable of selecting the desired view and capturing it. One suitable drawing viewer includes Adobe Acrobat®. In the particular example shown in FIG. 5, a user selects a camera tool 78 to select a range 80 capturing the desired view. The captured image can be "copied" onto a Windows® clipboard. It is appreciated, that the range must fully capture the entire component. Other exemplary software programs suitable for these steps include, but are not limited to, other Adobe® software products (Adobe Photo Home®, Adobe Photoshop®, etc), Kodak Image Viewer®, and Microsoft Paint®.

Figure 6:
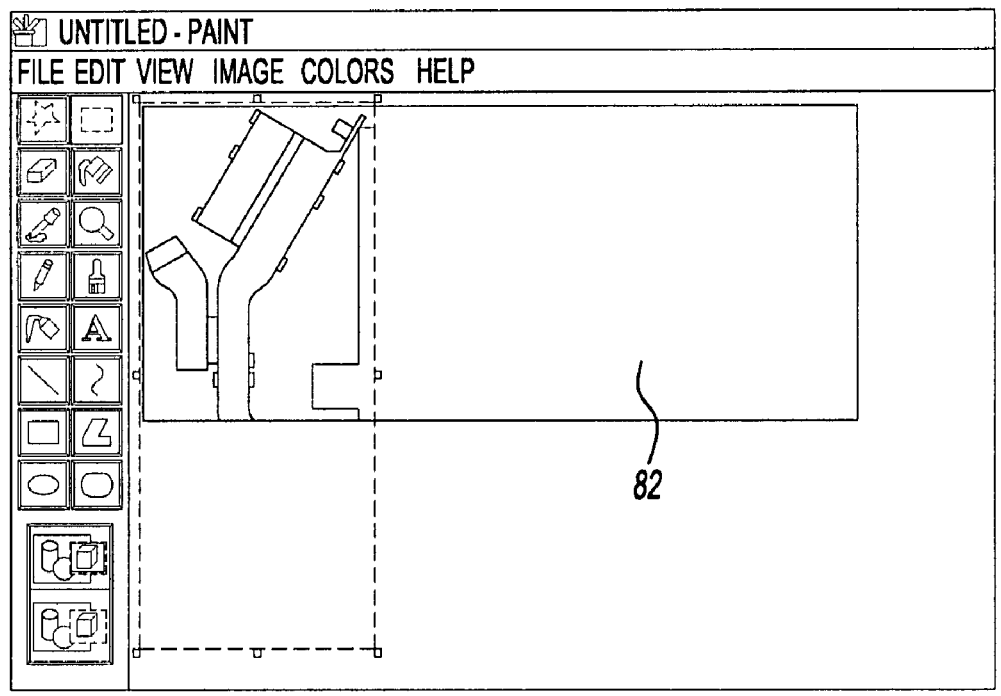
FIG. 6 is a screen shot of the desired component inserted into a software program with drawing manipulation capability.

With reference to FIG. 6, association of a rectangle image (step 36, FIG. 2), will now be described. A user can insert (or "paste") the captured range 80 into a drawing viewing program capable of saving a file as a monochrome bitmap. One suitable drawing viewing program includes Microsoft Paint®. The term "rectangle image" is used to denote a background or "canvas" 82. As shown in FIG. 6, the canvas 82 does not match the range 80 (FIG. 5) or footprint of the captured image. In one example, Microsoft Paint® may prompt the user to enlarge the canvas 82. The user can decline the prompt.

Figure 7:
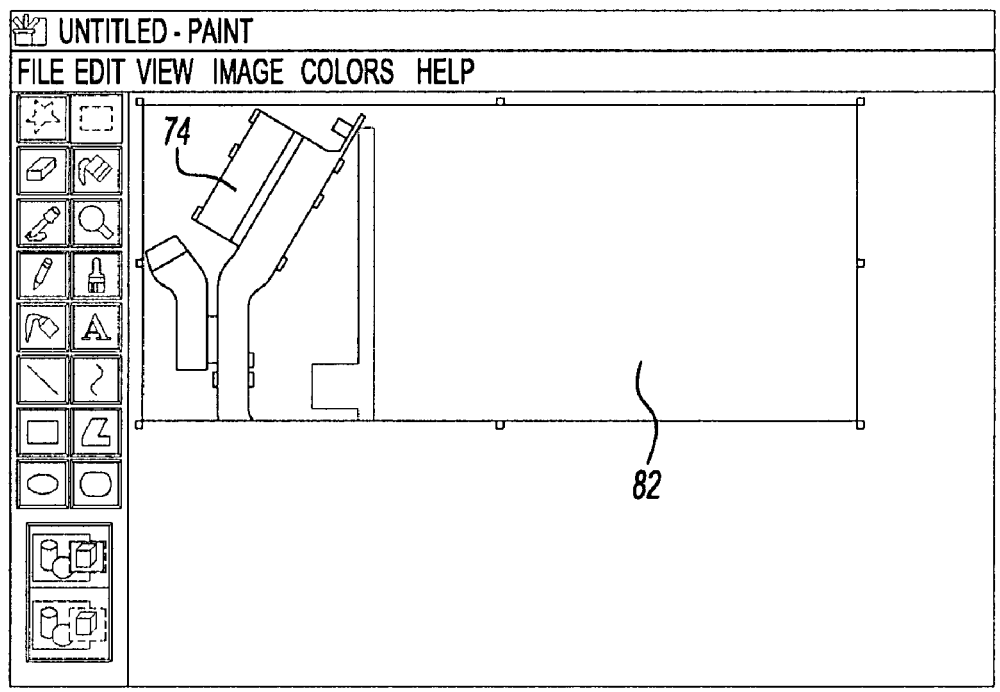
FIG. 7 is a screen shot FIG. 6 shown with a canvas selected for resizing.
Figure 8:
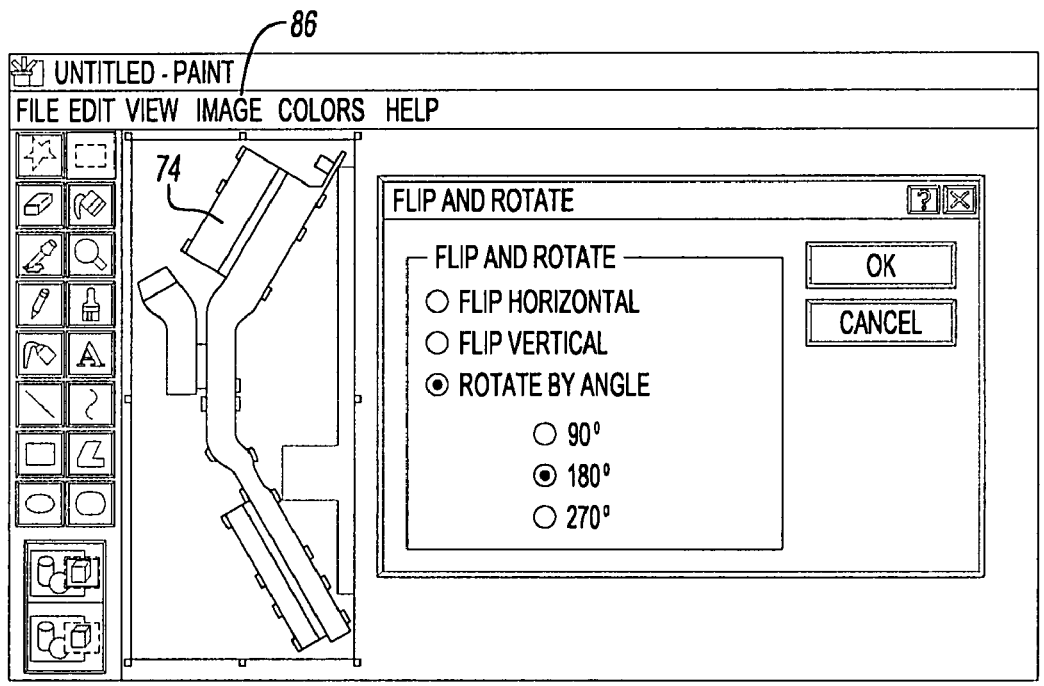
FIG. 8 is a screen shot of the desired component being rotated to fit within the canvas.

Turning now to FIGS. 7 and 8, manipulation of the canvas 82 to span respective edges of the component in the captured image (e.g., steps 40 and 42, FIG. 2) will be described. In the particular example shown, the canvas 82 is too small to accommodate the component 74 and must be re-sized. In some instances, it may be necessary to re-paste the image if the canvas 82 was too small. A correctly sized canvas 82 should just touch the bottom and right edges of the component. It is appreciated that a "click-and-drag" method of resizing the canvas 82 can be used. FIG. 8 illustrates one example of rotating the image to fit within the canvas 82. Since Microsoft Paint® does not allow the top or left of the canvas 82 to be resized, a user can select the "Image" icon 86 from the toolbar to manipulate the orientation of the component 74. In the example shown, a user can select to rotate the component by 180 degrees.

Figure 9:
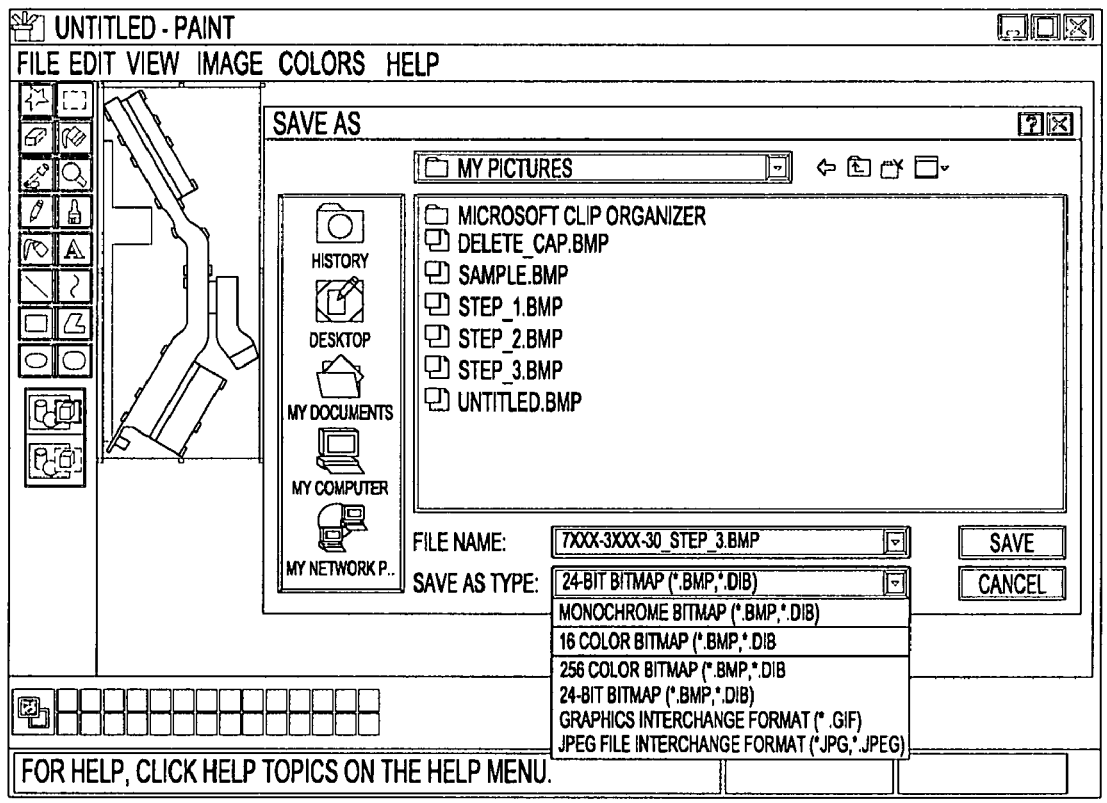
FIG. 9 is a screen shot illustrating the component being saved as a 16 color bitmap.

With reference now to FIG. 9, a user can save the file at this point in the event of problems with later steps. Additionally, a user can save the file as a "16 Color Bitmap". This will reduce the number of gray colors defining the outline of the part to three levels: light gray, dark gray and black.

Figure 10:
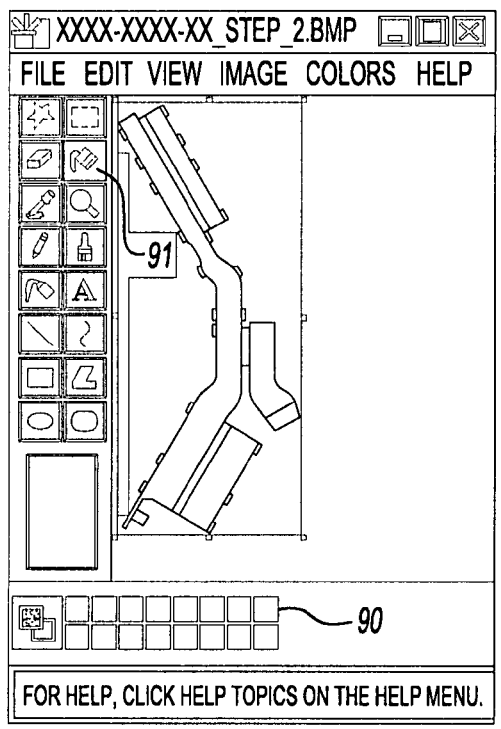
FIG. 10 is a screen shot illustrating a dark color being selected.
Figure 11:
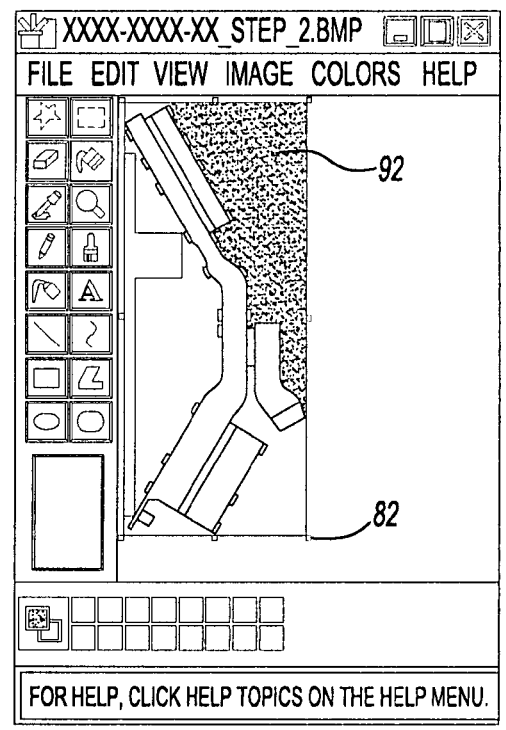
FIGS. 11-13 illustrate a sequence of filling in an area of the canvas outside the component.
Figure 12:
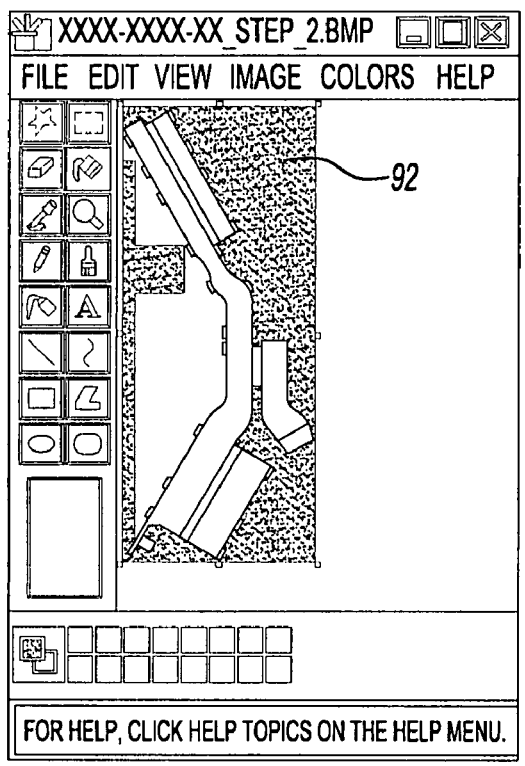
Figure 13:
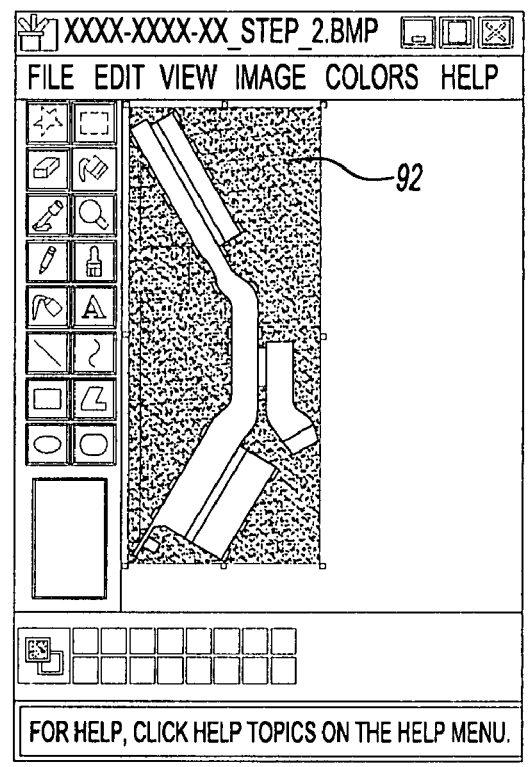
Figure 14:
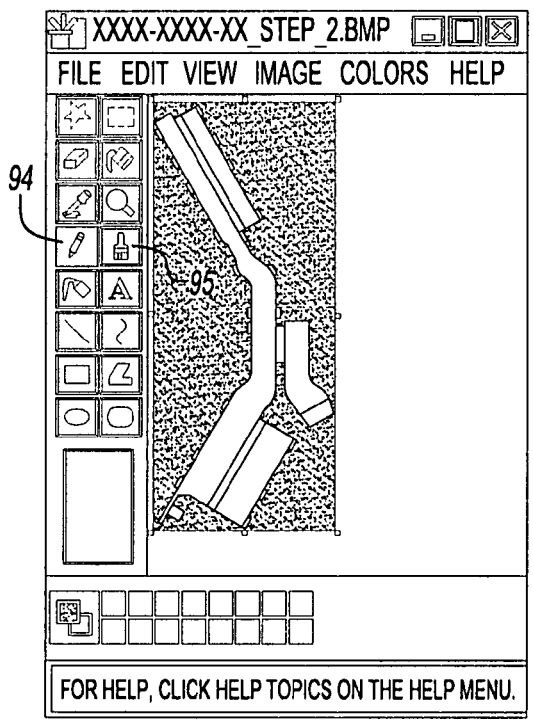
FIG. 14 is a screen shot showing the dimensional information of the component being filled with the dark color.

Turning now to FIGS. 10-14, a sequence of shading a non-component area of the image is shown (e.g., step 44, FIG. 2). In FIG. 10, the user can select a desired color, such as a dark color 90 using the "paint can" tool 91. In some instances, using the color black may interfere with the outline of the component in the image. In FIGS. 11-13, the non-component area 92 is shown being filled with the selected dark color 90. It is appreciated that only the non-component area 92 within the canvas 82 is shaded. In FIG. 14, a user can select the "pencil" tool 94 or paint brush tool 95 to fill in any additional features of the image outside of the component (i.e., the non-component area 92). For example, in some instances, various dimensional data may be present on the image. For increased accuracy, this data can be shaded with the same selected dark color 90.

Figure 15:
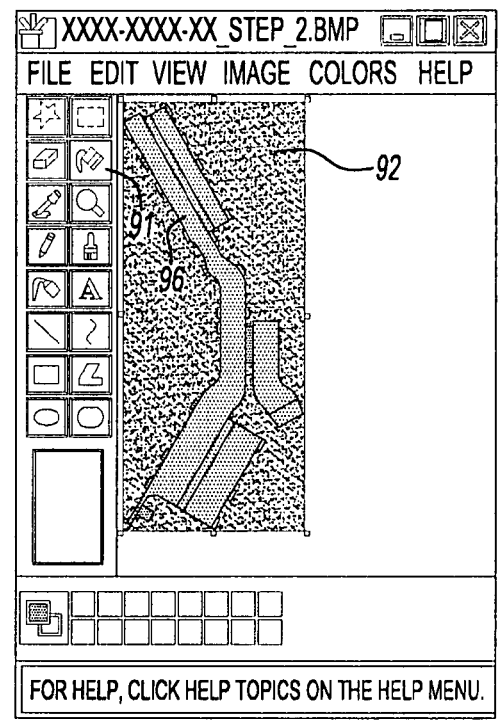
FIGS. 15-17 illustrate a sequence of filling in an area of the component with a light color.
Figure 16:
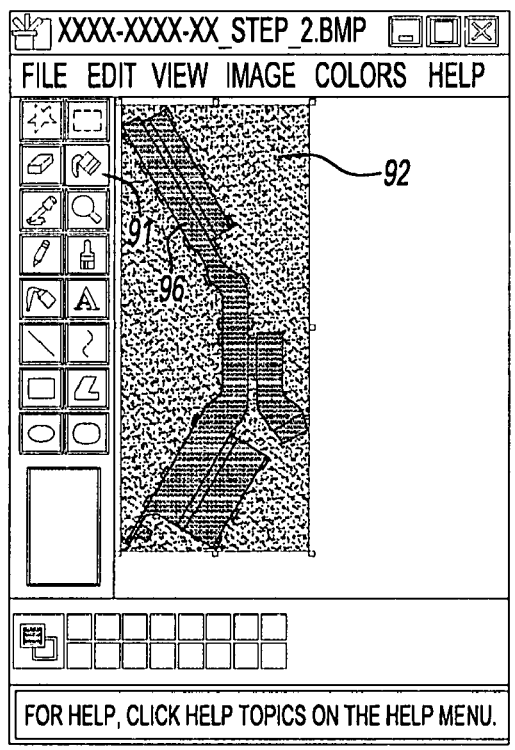
Figure 17:
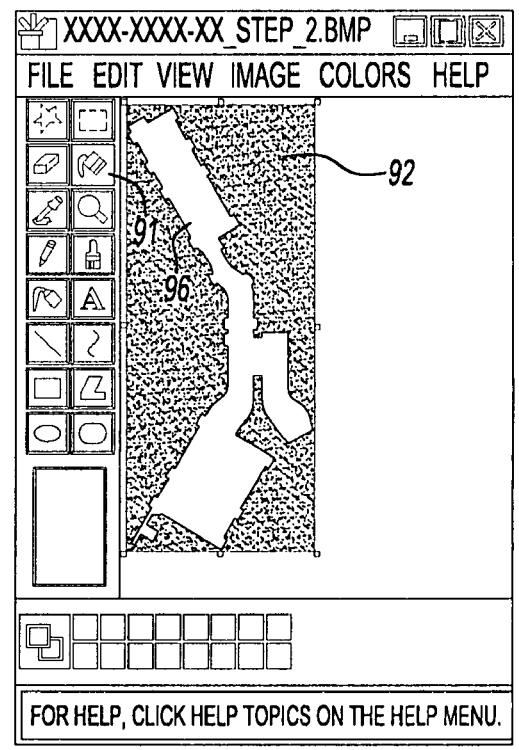

FIGS. 15-17 an exemplary sequence for shading a component area 96 a second color, distinct from the first color is shown. In this example, the "paint can" or fill tool 91 can be used. In this example, the collective component area 96 is turned white. It is appreciated that various other methods may be carried out while still reaching the result shown in FIG. 17. Explained further, the goal is simply to identify component area 96 by a shade different than a non-component area 92. In some examples, it is contemplated that a user may only need to perform a "shading" operation for one color on one area. For example, the component area 96 and/or the non-component area 92 may already define a desired color prior to performing the shading steps of step 44. Furthermore, a plurality of colors may be used during shading so long as the computational software 18 is configured to calculate a percentage of one color versus a collection remainder of colors. Next, the resultant shaded image can be saved as a monochrome bitmap file as shown in FIG. 18 (step 46, FIG. 2). It is important to recognize that the file may be saved in other formats suitable for any computational software that can interpret a percentage of a given color. The monochrome bitmap file is now ready for submission into the computational software 18 (FIG. 1).

Figure 20:
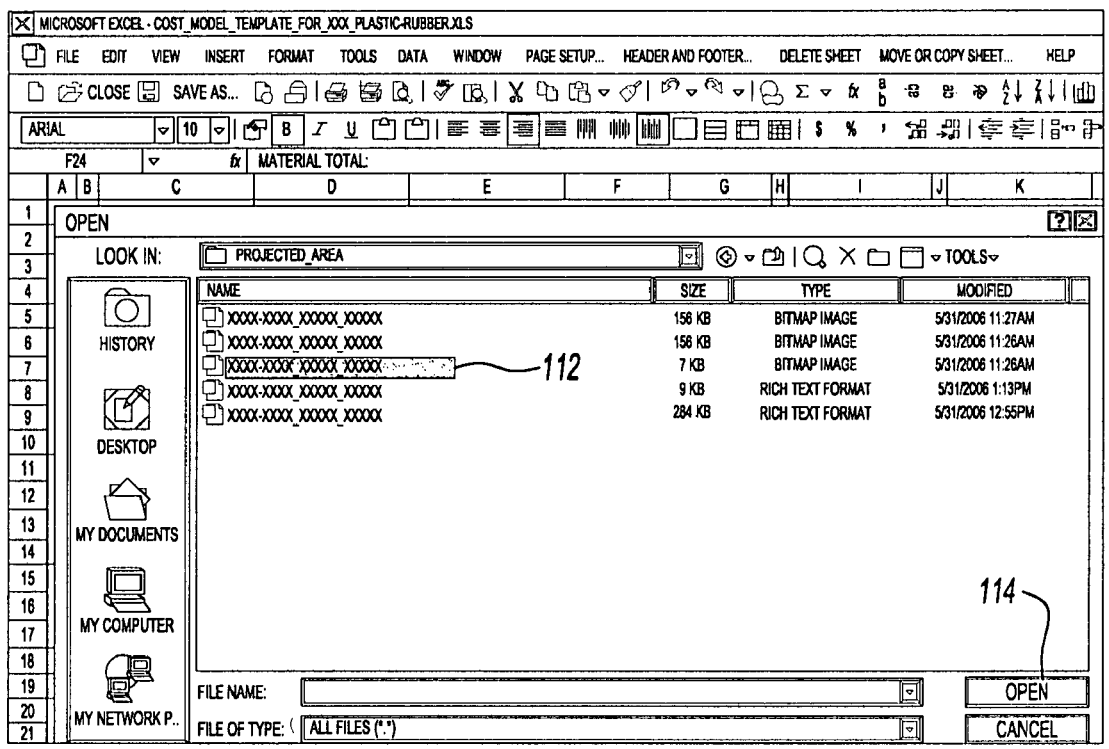
FIG. 20 is a screen shot of a user navigating to and opening the desired monochrome bitmap file.

Turning now to FIG. 19, computational software is shown having various fields representing component information. In the example shown, Microsoft Excel® is used. Of note, a user enters dimensional data of the component including $x_{maj}$ 100, and $y_{maj}$ 102. Exemplary units are shown in millimeters (mm). Once the dimensional data has been entered, a user can select the "Estimate Using MS Paint" button 110. The software is shown prompting the user to select the monochrome bitmap file. Turning to FIG. 20, a user can navigate to the desired monochrome bitmap file 112, highlight it and select the "open" button 114. By opening the monochrome bitmap file 112, the computational software 18 can calculate a percentage of dark color verses light color. In this particular example, a Visual Basic Macro determines a percent white verses black. The product of this percentage and the area of the rectangle drawn at the maximum x and y extent of the part (i.e. properly sized canvas 82, FIG. 8, also corresponding to the $x_{maj}$ 100 and $y_{maj}$ 102 entered in the dimensional data fields of FIG. 19) results in the projected area 20 (FIG. 1) of the component 74 (FIG. 4).

Returning now to FIG. 1, once the projected area 20 of the component 74 is determined, a calculation 22 can be made to determine a press tonnage 24. While the preceding discussion has been directed toward determining a press tonnage required to mold a component, the applications of such a method are not so limited. For example, other applications include metal stamping scrap calculations, solar power device design, wind turbine design, radiance calculations used in radiometry and photometry, center of pressure calculations used in rocketry, determination of design strength of concrete, determination of luminance intensity and flux in lighting measurement, aeronautics (such as aircraft wing design), parachute and paraglider design and fall-rate determination, sail design, measurement of radiation exposure, thunderstorm measurement (such as storm and reflectivity distribution), target identification using radar, infrared or other sensor technology, botany (such as calculation of Leaf Area Index, LAI), architecture and traffic signal design (such as calculation of wind pressure on structures), medical (such as radiography calculation), antenna design, mobile offshore drilling units (such as calculation of radius of curvature), water resource management (such as calculation of conservation of momentum and drag), hands-off measurement of livestock weight, hardness testing and surface topography characterization.

While the disclosure has been described in the specification and illustrated in the drawings with reference to various embodiments, it will be understood by those skilled in the art that various changes may be made and equivalents may be substituted for elements thereof without departing from the scope of the disclosure as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise above. Moreover, many modifications may be made to adapt a particular situation or material to the teachings of the disclosure without departing from the essential scope thereof. Therefore, it is intended that the disclosure not be limited to the particular embodiment illustrated by the drawings and described in the specification as the best mode presently contemplated for carrying out this disclosure, but that the disclosure will include any embodiments falling within the foregoing description and the appended claims.

What is claimed is:

1. A method of determining a projected area of a component comprising:
    acquiring an image file having a component drawing;
    superimposing the component drawing of the image file onto a workspace of a software program having drawing manipulation capability;
    shading one of a component area and a non-component area with a first color by manually outlining identified portions of the component area or the non-component area in the workspace with a computer input device that operably communicates with the software program to create a shaded image file, the other of the component area and non-component area having a second color distinct from the first color;
    calculating a ratio of the first color versus the second color;
    determining the projected area of the component based on the ratio calculated; and
    calculating a tonnage of a press based on the projected area.

2. The method of claim 1 wherein superimposing the component drawing includes cropping the workspace to actual boundaries of the component in the component drawing.

3. The method of claim 1 wherein acquiring the image file includes copying the image file within an operating system.

4. The method of claim 3 wherein acquiring the image file includes copying the image file onto a clipboard of the operating system.

5. The method of claim 4 wherein acquiring the image file includes pasting the image file into a software program having drawing manipulation capability.

6. The method of claim 3 wherein copying the image includes copying an image having one of a PDF JPEG, GIF, Bitmap, and TIFF file formats.

7. The method of claim 1 wherein the shaded image file includes a monochrome format bitmap file that includes at least two of black, white and gray colors.

8. A method of determining a projected area of a component, the method comprising the steps of:
    acquiring an image file having a component drawing;
    simultaneously associating a rectangle image from a drawing viewing program into a background of the component drawing in the acquired image file;
    cropping the rectangle image to actual boundaries of the component in the component drawing;
    shading a non-component area of the cropped rectangle image within a first range of colors and shading a component area of the cropped rectangle image within a second range of colors to create a shaded image file, the first and second ranges of colors being distinguishable from each other, wherein the shading of at least one of the non-component area and the component area comprises manually outlining identified portions of the component area or the non-component area with a computer input device that operably communicates with the drawing viewing program;
    activating a software program to read the shaded image file and compute a percent present of at least one of the range of colors;
    calculating the projected area of the component based on the percent computed; and calculating a tonnage of a press based on the projected area.

9. The method of claim 8 wherein acquiring the image file includes copying the image file within an operating system.

10. The method of claim 8 wherein acquiring the image file includes copying the image file onto a clipboard of the operating system.

11. The method of claim 10 wherein acquiring the image file includes pasting the image file into a software program having drawing manipulation capability.

12. The method of claim 10 wherein copying the image includes copying an image having one of a PDF, JPEG, GIF, Bitmap, and TIFF file formats.

13. The method of claim 8 wherein the shaded image file includes a monochrome format bitmap file that includes at least two of black, white and gray colors.

14. A method of determining a projected area of a component, the method comprising the steps of:
- saving a drawing of the component into a bitmap image file;
- simultaneously associating a rectangle image from a drawing viewing program into a background of the component drawing in the bitmap image file;
- cropping the rectangle image to actual boundaries of the component in the component drawing;
- shading a non-component area of the cropped rectangle image within a first range of colors and shading a component area of the cropped rectangle image within a second range of colors to create a shaded image file, the first and second ranges of colors being distinguishable from each other, wherein the shading of at least one of the non-component area and the component area comprises manually outlining identified portions of the component area or the non-component area with a computer input device that operably communicates with the drawing viewing program;
- activating a software program to read the shaded image file and compute a percent present of at least one of the range of colors;
- calculating the projected area of the component based on the percent computed; and
- calculating a tonnage of a press based on the projected area.

15. The method of claim 14 wherein the shaded image file includes a monochrome format bitmap file that includes at least two of black, white and gray colors.

* * * * *